Jan. 19, 1954  G. R. HUNT  2,666,621
WIPER FOR MEMBERS OPERATING IN WELLS
Filed March 22, 1951  2 Sheets-Sheet 1
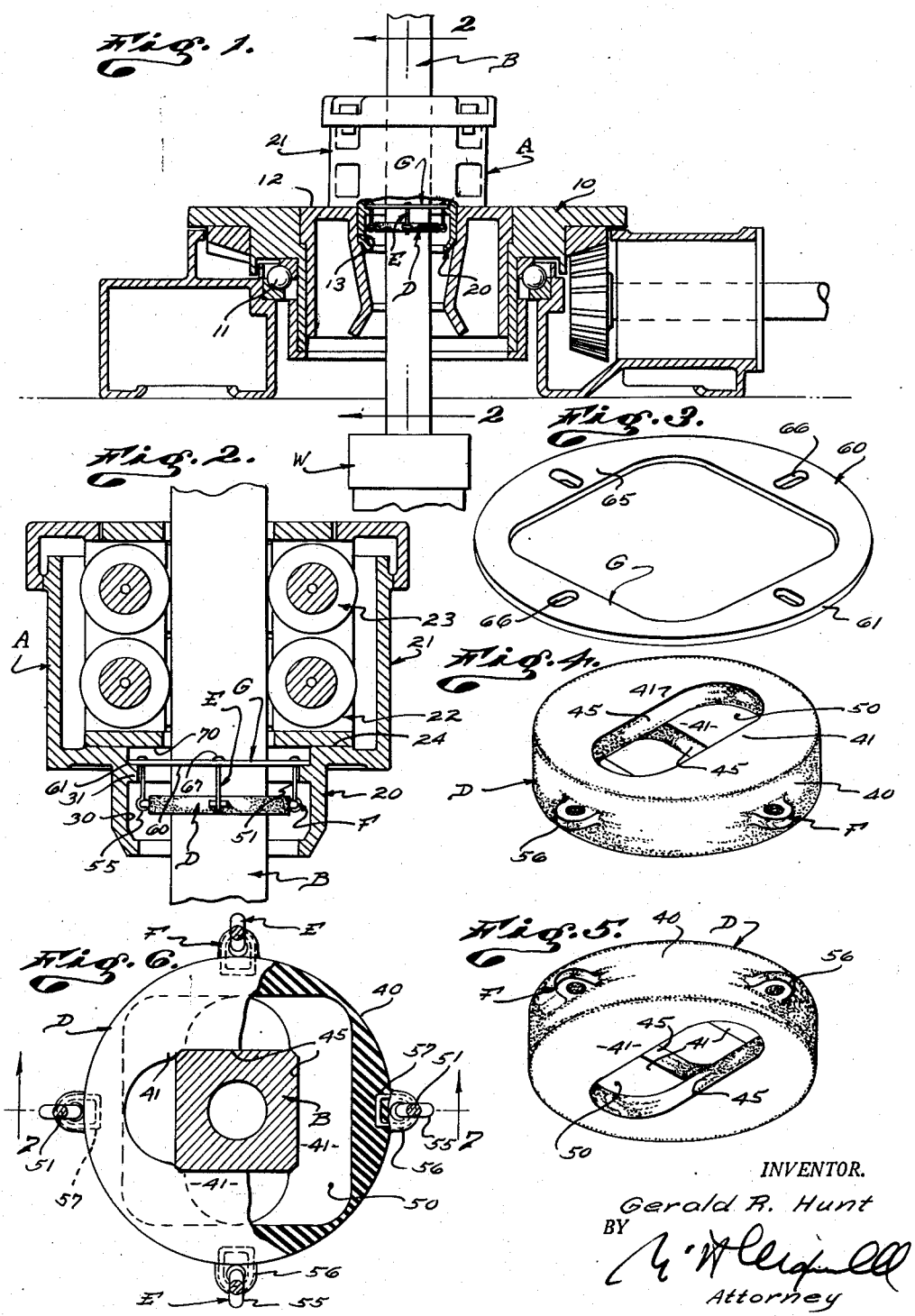
INVENTOR.
Gerald R. Hunt
BY
Attorney Jan. 19, 1954
G. R. HUNT
2,666,621
WIPER FOR MEMBERS OPERATING IN WELLS
Filed March 22, 1951
2 Sheets-Sheet 2
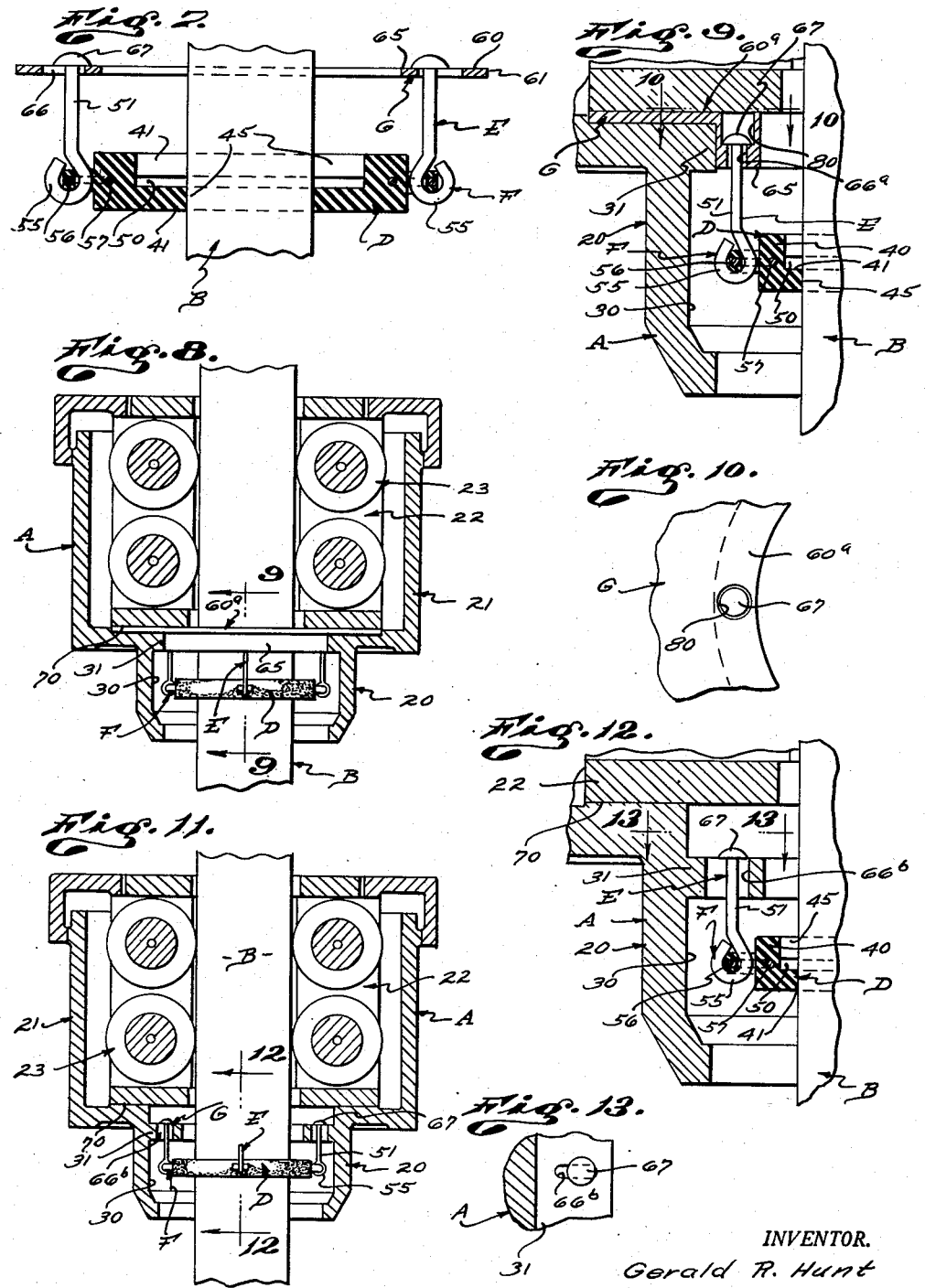
INVENTOR.
Gerald R. Hunt
BY
Attorney Patented Jan. 19, 1954

2,666,621

UNITED STATES PATENT OFFICE 2,666,621

WIPER FOR MEMBERS OPERATING IN WELLS

Gerald R. Hunt, Long Beach, Calif.

Application March 22, 1951, Serial No. 217,003

17 Claims. (Cl. 255—23)

This invention is concerned with wipers to engage or act upon parts engaged in a well, and more specifically it is concerned with wipers for use in connection with elements of a well at the top or head of the well and serving to engage a string or member entered in the well in order to wipe or strip material therefrom in the course of such string or member being withdrawn from the well or moved upwardly therein. It is a general object of the invention to provide a wiper or device of the general character referred to which is of simple, inexpensive construction, which is durable, which is such that it can be easily and quickly installed or established in operating position, and which is highly effective in action.

Wipers are commonly used in connection with various parts or members employed in wells for the purpose of wiping or stripping material therefrom. The usual wiper of this sort is characterized by a simple disc of rubber, or like material, having a central hole slidably passing the part or member to be wiped and having its peripheral portion fixed or rigidly secured to a well part such as a part of a rotary unit, say, for instance, a Kelly bushing located in such unit. In a typical case of this kind the wiper, being rigidly fixed to a well part such as a part of the rotary unit, is not free to properly accommodate itself to the member being wiped, and consequently, the wiping action is not always satisfactory, the wiper itself is subject to injury or rapid wear, and there is not the necessary freedom of operation that should prevail.

It is a general object of this invention to provide a wiper construction of the general character referred to that is particularly useful and practical for application to a rotary unit, and which is such as to satisfactorily wipe members that are other than round in cross section, say, for instance, kellies, or the like.

A further object of this invention is to provide a simple, inexpensive, effective wiper that can be easily and effectively applied to or incorporated in connection with a roller Kelly bushing carried in a rotary table, to the end that the wiping part or collar of the wiper engages the kelly handled by the bushing at a point suitably spaced below the working parts of the bushing and is free to shift or vary its position in the event that the parts are worn or such as to result in misalignment or relative movement in the course of operation of the kelly.

It is another object of the invention to provide a wiper of the general character referred to which is such that it can be applied to or installed in connection with a conventional roller Kelly bushing without the necessity of modifying the bushing construction and without in any way encumbering or interfering with the action of the Kelly bushing.

Another object of the invention is to provide a wiper of the general character referred to applicable to a roller Kelly bushing and which is such that the wiping element or collar of the wiper has limited universal movement relative to the bushing and to the kelly handled thereby, so that there is no danger of excessive wear or injury of parts such as results when a wiper is mounted in a fixed position.

The wiper of the present invention is such that it can be used to advantage in various situations and by suitably fashioning the wiping collar of the device it can be made to fit or to wipe parts of various sizes and shapes, for instance, parts that are round in cross section and even parts that are polygonal in cross section. The invention is particularly practical for use in a situation where a polygonal kelly is to be wiped. In such case the wiper is applied to or carried by a rotary unit or, more specifically, by a roller Kelly bushing carried in the table of a rotary unit, and the wiper is mounted in or carried by the depending polygonal portion of the bushing body accommodated in the polygonal socket of a master bushing incorporated in the table of the rotary unit. In the case of the conventional roller Kelly bushing the lower or depending polygonal portion that seats in the socket of the drive bushing supports a body which is enlarged and which carries a plurality of cages holding rollers that, in turn, engage the sides or flat faces of the kelly. In the usual roller Kelly bushing of the character mentioned the lower or depending polygonal portion of the bushing body has a vertical passage or bore considerably larger than the kelly and passing the kelly. Further, within this portion of the bushing body there is, ordinarily, an inwardly projecting flange that is located somewhat below the seat or shoulder in the body which supports the cages that carry the rollers.

In a preferred application of the present invention the wiper is located in or carried by the aforementioned lower end portion of the Kelly bushing body, and in its preferred form the wiper involves, generally, a collar of rubber or like material that engages and wipes the kelly, and hangers that support the collar from the flange in the Kelly bushing body. The wiping collar, in its preferred form, is characterized by a continuous annular rim and lips project inwardly from the rim to engage and wipe the kelly. In the preferred arrangement, as where the kelly is square in cross-sectional configuration, the lips of the collar are in pairs and there need be but two pairs of lips. In a typical form there is an upper pair of lips projecting inwardly from diametrically opposite sides of the rim and having straight, opposed and spaced wiping edges that engage opposite sides or faces of the kelly. The other pair of lips is spaced vertically from the first mentioned pair and it is the same as the first mentioned pair, except that the lips are in a different rotative position, being located 90° from the first mentioned pair of lips, so that they engage and wipe the other faces of the kelly.

The hangers that support the wiping collar may be varied in number, as circumstances require, and in a typical case there are several hangers, say, for instance, four, each characterized by an elongate, rigid member or rod, means connecting the lower end of the rod to the wiping collar, and means connecting the upper end of the rod to the flange of the bushing body. In a typical case the means or connections between the lower ends of the rods and the collar involve eyes projecting radially outward from the periphery of the rim and fixed or secured to the rim by suitable anchors embedded therein. Eyes on the lower ends of the rods are engaged through or linked with the eyes on the collar, the engagement being such as to provide for suitable play or looseness between the engaged parts.

The connections between the upper ends of the rods and the flange of the bushing body may be varied, depending upon conditions. In a typical instance a hanger plate, annular in form, is engaged on the flange of the bushing body to be supported thereon and confined between the hanger flange and the cages of the bushing. The hanger plate projects radially inward somewhat from the flange or has portions that so project, and it is provided inward of the flange with openings that pass the rods. Heads provided on the upper ends of the rods engage the top side of the hanger plate and prevent displacement of the rods from the plate. The engagement of the rods with the plate is such as to provide a suitable looseness or play between the parts, while at the same time the rods are effectively anchored to the plate so that they cannot become separated therefrom. If desired sockets may be provided in the hanger plate to accommodate the heads on the rods, and at the same time provide for suitable vertical movement of the rods relative to the plate, such structure being desired in cases where the bottoms of the roller cages closely approach the flange that supports the hanger plate. In another situation the rods can be directly coupled or engaged with the flange of the bushing body, in which case openings in the flange accommodate or pass the rods and the heads on the upper ends of the rods engage the upper side of the flange.

The various objects and features of my invention will be fully understood from the following detailed description of typical preferred forms and applications of the invention, throughout which description reference is made to the accompanying drawings, in which:

Fig. 1 is a sectional view of a rotary unit shown over or in connection with a well, with a kelly passing through the rotary unit and into the well and showing a wiper embodying the present invention carried by the roller Kelly bushing of the rotary unit so as to wipe or strip material from the kelly as it is operated upwardly through the rotary unit. Fig. 2 is an enlarged detailed sectional view of a portion of the structure shown in Fig. 1. Fig. 3 is a perspective view of a typical form of hanger plate provided by the present invention to be supported by the flange of the bushing body, and to carry the rods of the hangers, the plate being shown separate from the other parts. Fig. 4 is a perspective view showing the wiper collar separate from the other parts and viewed to show its upper side. Fig. 5 is a view similar to Fig. 4 with the collar viewed to show its lower side. Fig. 6 is an enlarged plan view of the wiper collar, showing it held by hangers and with parts broken away to show in section. Fig. 7 is a vertical detailed sectional view taken as indicated by line 7—7 on Fig. 6. Fig. 8 is a view similar to Fig. 2 showing another form of hanger plate in side elevation and in operating position in the body of the roller Kelly bushing. Fig. 9 is an enlarged detailed sectional view taken as indicated by line 9—9 on Fig. 8. Fig. 10 is a fragmentary view taken generally as indicated by line 10—10 on Fig. 9. Fig. 11 is a view similar to Figs. 2 and 8, showing another manner of securing the hanger bars to the body of the Kelly bushing. Fig. 12 is an enlarged detailed sectional view taken as indicated by line 12—12 on Fig. 11, and Fig. 13 is a fragmentary view taken as indicated by line 13—13 on Fig. 12.

Referring, first, to the form of the invention illustrated in Figs. 1 to 7, inclusive, the wiper provided by the present invention is shown carried by a roller Kelly bushing A which is a part of or which is carried by a rotary unit in operating position with reference to a well W. In the drawings a typical polygonal kelly B is shown projecting up from the well through the rotary unit so that it extends through and is engaged by the Kelly bushing A. The rotary unit illustrated in the drawings is of the typical type characterized by a bale 10, mounted through suitable bearings 11 and carrying a master bushing 12 that has a central opening. The opening defined by the master bushing has an upper socket portion 13 polygonal in cross sectional configuration and such as to receive a part of the Kelly bushing A.

The particular Kelly bushing A, illustrated in the drawings, is of standard or conventional form and it is characterized by a lower portion 20 polygonal in cross section and such as to enter or seat in the polygonal socket 13 of the master bushing 12. An enlarged head portion 21 of the bushing body projects upwardly from the bushing engaging portion 20 and this head portion occurs above the top of the bushing 12 and table 10. Cages 22 are carried in the head portion 21 of the bushing body and rollers 23 are rotatably mounted in the cages and have driving engagement with the kelly. An upwardly facing seat or rest 24 occurs in the bushing body where the portion 20 is connected to the portion 21 and the cages 22 seat or rest upon the seat 24.

The lower or depending portion 20 of the bushing body that engages in the socket 13 is shaped so that its exterior is polygonal in form to fit the socket 13. A central opening or bore 30 extends vertically through the bushing body portion 20 and, in accordance with conventional construction, a flange 31 projects inwardly from the wall of the opening or bore 30 at a point spaced somewhat below the seat 24, as shown throughout the drawings. The flange 31 projects radially inward from the wall of the bore 30, but is of limited extent so that the kelly is accommodated by the portion 20 with substantial clearance.

The wiper provided by the present invention is characterized by a collar D, hangers E, means F connecting the hangers and collar, and means G connecting the hangers and the body of the Kelly bushing, preferably the flange 31 thereof.

The wiper collar D as provided by the present invention is preferably a unit of rubber or rubber-like material, and it involves an annular rim portion 40 somewhat larger in diameter than the kelly so that it fits around the kelly with clearance, and lips that are provided on and which project inwardly from the rim to engage and wipe the sides of the kelly. In practice the parts of the wiper collar, and particularly the lips thereof, may be varied in number, arrangement, and relationship, depending upon the particular member or object passed by the collar and to be wiped thereby. Since the usual kelly is square in cross sectional configuration I have illustrated a wiper collar suitable for use on such standard kelly. However, it is to be understood that this particular disclosure is not to be considered as in any way limiting the invention, since the lips may be made or shaped to fit not only polygonal kellies having four sides, but such or like members having any number of sides, and if desired, the lips may be fashioned to fit or accommodate members round in cross section, rather than polygonal. When I refer to the collar D as being of rubber I mean to include not only natural but synthetic rubber and any other suitable composition or combination of materials having the general characteristics of rubber and such as to flex or conform in the manner of the collar that I describe.

In the particular wiper collar illustrated there are four lips, one for each side of the kelly, and these lips are arranged in pairs so that there is an upper pair of lips and a lower pair of lips. In the preferred arrangement the lips 41 of the upper pair are opposite each other, that is, they project radially inward from diametrically opposite parts of the rim 40 and they have straight spaced parallel wiping edges 45 spaced and related to engage and have the desired wiping action on opposite sides or walls of the kelly B. In practice the lips may be shaped or proportioned so that they are under some compression when engaged with the kelly, and if desired the wiping edges 45 can be of special form or design so that they are highly effective in wiping the walls of the kelly. In the particular case illustrated the upper sides of the lips 41 are flush with the upper end of the rim 40.

The lips 41 of the lower pair are below the upper pair of lips just described, and in the particular case illustrated, since the kelly is square, the lower pair of lips occurs in the rim 90° around the rim from the first mentioned pair of lips, so that the lower lips engage the other walls of the kelly, that is, the ones not wiped by the first mentioned pair of lips. In all other respects the lips of the lower pair may be the same as those of the upper pair, and as shown in the drawings, their lower sides may be flat and flush with the lower end of the rim 40. In the preferred form of the invention the two pairs of lips are spaced somewhat apart or vertically so that there is a space or clearance 50 between the upper and lower pairs of lips, as clearly shown in Fig. 7 of the drawings.

The hangers E may be varied widely in form and construction and they may be varied in number, as circumstances require. In a case such as is illustrated in the drawings it is practical to provide four hangers E and they may be alike, as shown throughout the drawings. In the preferred form of the invention each hanger E is formed of a simple elongate rod or bar 51.

The means F provided at the lower end of each hanger rod 51 connects such rod to the wiper collar D and the construction is such as to allow for limited universal movement of the rod relative to the collar. In the preferred form of the invention the means F in connection with each rod involves a loop or eye 55 formed on the lower end of the rod and a loop or eye 56 provided on the wiper collar, preferably on the rim 40 thereof. In the preferred form of the invention the eye 56 is provided on the outer peripheral portion of the rim 40 so that it projects radially outward therefrom and it may be located midway between the upper and lower ends of the rim, as shown throughout the drawings. The eye 56 may be anchored to or mounted on the rim 40 in any suitable manner, for instance, it may be provided with an inwardly projecting anchor 56 that can, in practice, be advantageously embedded in the rim as the collar is manufactured or formed. It is to be understood that the eye 56 and its anchor 57 are, in practice, formed of metal, while the wiper collar is otherwise formed entirely of rubber and may be a unitary or integral body of rubber formed by molding or other suitable process of manufacture.

The means G by which the upper ends of the rods 51 are connected to the body of the bushing may vary in form and construction. In the form of the invention under consideration, as where the flange 31 in the body portion 20 of the Kelly bushing is spaced a substantial distance below the seat 24, it is preferred to provide a hanger plate 60 which fits into the bore 30 and rests upon the flange 31. In such case a single plate 60 serves as a part of or in connection with the several means G by which each rod 51 is connected to the bushing body. Where a plate 60 is employed its outer periphery 61 is shaped and proportioned so that the plate will fit down into the bore 30 from the upper end thereof until the plate rests upon the top or upper side of the flange 31. The plate 60 is proportioned so that it has one or more inwardly projecting portions 65 that project radially inward from the flange 31 to be clear of the flange and at the same time well spaced from the kelly so that the plate is never engaged by the kelly. The parts or portions 65 of the plate have vertical openings 66 therein, preferably in the form of slots, and the rods 51 extend or project upwardly through the slots 66. Heads 67 on the upper ends of the rods 51 engage or bear upon the upper sides of the plate portions 65 and positively prevent downward displacement of the rods from the plate. Where the openings 66 are slot-like in formation they are preferably arranged to extend radially, as shown in Fig. 3, and the slots and rods are related so that the rods are free to move a limited amount in any direction. It is to be observed that when this form of the invention is employed the rods are free to move up relative to the plates so that the collar carried by the rods can move vertically. This vertical movement, however, is limited by the lower ends 70 of the cages that overlie the plate 60.

With the wiper constructed as hereinabove described the collar D, hangers E, and the hanger plate, form a permanently joined or connected assembly and, as shown in the drawings, the hanger plate is of such size or outside diameter that it cannot be lost or accidentally dropped down through the body of the Kelly bushing to enter the well W. The wiper assembly or unit provided by the present invention can be easily and conveniently assembled or incorporated in the roller Kelly bushing A as the bushing parts are assembled relative to the kelly B, and when the wiper is in place the plate 60 is securely confined between the flange 31 and the lower ends 70 of the cages in the Kelly bushing. The hanger rods 51 depend from the hanger plate and support the wiper collar a suitable distance below the flange 31 with the lips of the wiper collar engaging the several sides or faces of the kelly.

As the structure operates the wiper collar remains in proper wiping engagement with the kelly, even though there may be some misalignment of the kelly relative to the bushing or some lateral working or shifting of the kelly in the bushing, such as results from looseness of parts or wear. Furthermore, by suitably relating or proportioning the lips of the wiper collar relative to the kelly the lips will remain in proper wiping engagement with the faces of the kelly throughout the length of the kelly, even though the kelly faces may be worn or somewhat distorted, or even though there may be variations in size at different points along the kelly. It will be apparent that the wiper collar is positioned well below the rollers of the Kelly bushing so that the wiper lips cannot be engaged by the rollers and dragged into the bushing as often occurs with ordinary wipers. It will also be apparent from the foregoing description, and from consideration of the drawings, that as the rotary unit is operated the Kelly bushing effectively drives the kelly in the usual manner, and the kelly is free to be moved vertically either up or down through the bushing without any interference whatever from or as a result of the wiper being present on the kelly. As the kelly is moved upwardly or elevated, any foreign matter such, for example, as oil or mud, or both, occurring on the kelly, is effectively wiped therefrom and, consequently, such material never gets above the Kelly bushing in a manner to be thrown into the derrick or over the rotary unit to endanger or inconvenience the operators.

In the case of some roller Kelly bushings the body thereof may be formed so that there is not adequate room to allow for proper vertical movement of the hanger bars, and there may not be room enough to accommodate the heads 67 on the hanger bars above the top sides of the plate. In Figs. 8, 9 and 10 of the drawings I illustrate such a situation and in such case I prefer to recess the heads 67 on the hanger bars 51 into the hanger plate. In the particular case illustrated the inwardly projecting portions 65 of the hanger plate 60ᵃ, shown in Figs. 8, 9 and 10, is thickened vertically and sockets 80 of substantial vertical extent extend downwardly in the portions 65 from the top side or face of the plate to communicate with the openings 66ᵃ in the plate which pass the bars 51. The sockets 80 are of such size as to accommodate the heads 67 on the upper ends of the bars 51. In this case, as in the form of construction first described, the parts by which the hanger bars are connected to or supported from the flange 31 are loosely engaged or connected so that the bars have limited universal movement and are free to move somewhat vertically.

In the form of the invention illustrated in Figs. 11, 12 and 13, a hanger plate such as I have referred to above, is eliminated and the openings that receive the hanger bars are provided directly in the flange 31 of the body of the roller Kelly bushing. In this case openings 66ᵇ are provided through or in the flange 31 and they may correspond in character to the openings 66 hereinabove described. The rods 51 extend upwardly through the openings 66ᵇ and the heads 67 on the upper ends of the rods engage or bear upon the upper side of the flange 31 and thus prevent downward displacement of the rods from the flange. In this case the space between the flange 31 and the lower ends of the cages 22 allow for the desired vertical movement of the rods 51 relative to the flange, and the looseness of fit or engagement between the parts allows for the desired limited universal movement of the rods.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. An attachment for a rotary unit and adapted to engage an object extending through the unit including, a collar engaged around the object and a substantially vertical hanger having its lower end connected to the collar for limited movement relative thereto and having its upper end adapted to connect to the unit for limited movement relative thereto, the collar having an annular rim and an eye on the rim at the outer periphery thereof and holding the hanger.

2. An attachment for a rotary unit and adapted to engage an object extending through the unit including, a collar engaged around the object and a substantially vertical hanger having its lower end connected to the collar for limited movement relative thereto and having its upper end adapted to connect to the unit for limited movement relative thereto, the collar having an annular rim and a projection on the rim holding the hanger and the hanger including a rod with a part at its lower end loosely coupled to said projection.

3. An attachment for a rotary unit and adapted to engage an object extending through the unit including, a collar engaged around the object and a substantially vertical hanger having its lower end connected to the collar for limited movement relative thereto and having its upper end adapted to connect to the unit for limited movement relative thereto, the collar having an annular rim and an eye on the rim at the outer periphery thereof and holding the hanger, and the hanger including a rod with an eye at its lower end engaged with the eye on the collar.

4. An attachment for a rotary unit and adapted to engage an object extending through the unit including, a collar engaged around the object and a substantially vertical hanger having its lower end connected to the collar for limited movement relative thereto and having its upper end adapted to connect to the unit for limited movement relative thereto, the collar having an annular rim, a projection on the rim holding the hanger, and spaced lips projecting inward from the rim and engaging the object.

5. An attachment for a rotary unit and adapted to engage an object extending through the unit including, a collar engaged around the object and a substantially vertical hanger having its lower end connected to the collar for limited movement relative thereto and having its upper end adapted to connect to the unit for limited movement relative thereto, the collar having an annular rim and spaced lips projecting inward from the rim and engaging the object, the lips being spaced apart axially of the rim.

6. An attachment for the rotary unit of a well drilling rig and adapted to engage an object extending through the unit including, a unitary collar engaged continuously around the object and a substantially vertical hanger having its lower end connected to the collar for limited movement relative thereto and having its upper end adapted to connect to the unit for limited movement relative thereto, the collar having an annular rim and spaced lips projecting inward from the rim and adapted to have wiping engagement with the object, the lips being spaced apart vertically and being in pairs in different positions around the object, the lips of each pair having opposing edges engaging opposite sides of the object.

7. An attachment for a rotary unit having a flange and adapted to engage an object extending through the unit including, a collar with object-engaging lips, and a hanger with its upper end portion loosely coupled to the flange and its lower end loosely coupled to the collar.

8. An attachment for a rotary unit having an apertured flange and adapted to engage an object extending through the unit including, a collar with object-engaging lips, and a hanger with its upper end portion loosely engaged through the aperture of the flange and its lower end loosely coupled to the collar.

9. An attachment for a rotary unit having an apertural flange and adapted to engage an object arranged to extend vertically through the unit including, a plate supported on the flange, a hanger having its upper end coupled to the plate for limited universal movement, and a collar with wiping parts therein adapted to engage the object, the lower end of the hanger being coupled to the collar for limited universal movement relative thereto.

10. An attachment for a rotary unit having an apertural flange and adapted to engage an object arranged to extend vertically through the unit including, a plate supported on the flange, a hanger having its upper end coupled to the plate for limited universal movement relative thereto, and a collar below the flange and having wiping parts therein adapted to engage and wipe the object, the lower end of the hanger being coupled to the collar for limited universal movement relative thereto, the hanger including a rod passing upwardly through the plate and having a head on its upper end engaging the top of the plate.

11. An attachment for a rotary unit having flange with an opening therein and adapted to engage an object arranged to extend through the unit including, a plate adapted to be supported on the flange, a hanger having its upper end coupled to the plate for limited universal movement relative thereto, and a collar adapted to be arranged below the flange and having wiping parts therein, the lower end of the hanger being coupled to the collar for limited universal movement relative thereto, the plate having an inwardly projecting portion with a socket therein and the hanger including a rod extending through the plate and into the socket and having a head on its upper end seated in the socket.

12. In combination, a rotary unit having a Kelly bushing with a flange therein, a wiper collar, and hangers carrying the collar and coupled to the flange whereby the collar is supported below the flange for limited universal movement relative to the bushing.

13. An attachment for the rotary unit of a well drilling rig and adapted to engage an elongate object extending through the unit including, a collar adapted to be engaged continuously around the object, the inner peripheral portion of the collar being a wiper adapted to engage and wipe the exterior of said object, a substantially vertical hanger having its lower end connected to the collar for limited movement relative thereto, and means at the upper end of the hanger adapted to connect to the unit and support the hanger for limited movement relative to the unit.

14. An attachment for the rotary unit of a well drilling rig and adapted to engage an elongate object extending through the unit including, a collar adapted to be engaged continuously around the object, and a substantially vertical hanger having its lower end connected to the collar for limited movement relative thereto and having its upper end adapted to connect to the unit for limited movement relative thereto, the collar having an annular rim and a projection on the rim holding the hanger.

15. An attachment for the rotary unit of a well drilling rig and adapted to engage an object extending vertically through the unit including, a unitary collar engaged around the object, a substantially vertical hanger, means connecting the lower end of the hanger to the collar for limited movement relative thereto, and means adapted to connect the upper end of the hanger to the unit for limited movement relative thereto, the collar having an annular rim and vertically spaced lips projecting inward from the rim and adapted to engage and wipe the object.

16. An attachment for the rotary unit of a well drilling rig and adapted to engage an object extending vertically through the unit including, a collar engaged continuously around the object, a substantially vertical hanger, means connecting the lower end of the hanger to the collar for limited movement relative thereto, and means adapted to connect the upper end of the hanger to the unit for limited movement relative thereto, the collar having an annular rim and vertically spaced lips projecting inward from the rim and adapted to have wiping engagement with the object, the lips being opposed to each other and having edge portions engaging the object at opposite sides thereof.

17. An attachment for the rotary unit of a well drilling rig and adapted to engage an object extending through the unit including, a unitary collar engaged around the object and a substantially vertical hanger having its lower end connected to the collar for limited movement relative thereto and having its upper end adapted to connect to the unit for limited movement relative thereto, the collar having an annular rim and having spaced lips projecting inward from the rim and adapted to have wiping engagement with the object, the lips being spaced apart vertically and being in pairs in different positions around the object.

GERALD R. HUNT.

References Cited in the file of this patent

UNITED STATES PATENTS

| Number | Name | Date |
|---|---|---|
| 638,546 | Belden | Dec. 5, 1899 |
| 1,680,372 | Fenn | Aug. 14, 1928 |
| 2,480,371 | Kalhoefer | Aug. 30, 1949 |
| 2,510,114 | Hummel | June 6, 1950 |
| 2,568,247 | Medearis | Sept. 18, 1951 |